UNITED STATES PATENT OFFICE.

ALBERT K. EPSTEIN, OF CHICAGO, ILLINOIS.

PRESERVED EGGS AND PROCESS THEREFOR.

1,426,559. Specification of Letters Patent. Patented Aug. 22, 1922.

No Drawing. Application filed December 9, 1920. Serial No. 429,358.

*To all whom it may concern:*

Be it known that I, ALBERT K. EPSTEIN, a citizen of the United States, residing at Chicago, in the county of Cook and State of Illinois, have invented a certain new and useful Improvement in Preserved Eggs and Processes Therefor, of which the following is a specification.

This invention relates to the treatment of eggs, particularly those intended for use in more or less large quantities in the production of edible products such, for instance, as ordinary bakery products, noodles, salad dressings, confectionery, etc.

It has heretofore been the practice to take large numbers of eggs, first candle them, then, after opening them, freeze the contents either in their entirety or as separate yolks and whites and use the frozen product in the above mentioned general art.

One great trouble with such products heretofore on the market, particularly in the case of yolks and mixed or whole eggs, has been that the egg material breaks up in the process of freezing into water and other materials which do not reassemble themselves in the original egg form when the product is thawed out preparatory to use by the baker or other ultimate consumers.

The object of this invention is to so treat the eggs that they retain, throughout the freezing and thawing operation practically their original physical construction or colloidal condition with the result that they are just as efficient in their ultimate use as though they were fresh. A further object is to provide a material which while performing this function of keeping the eggs in good condition, also has meritorious uses of its own in the resulting egg product as used by the ultimate consumer. The invention consists in a process for obtaining the above results as well as in the resulting egg product, which is finally ready for use. The invention also consists in other features which will be described later in the specification.

In carrying out this invention the case, or other quantities of eggs which are to be converted into finished products is placed in a convenient position so that the operator can first candle each egg to see that it is of an edible nature, the operator then breaks each egg into a sterilized cup for re-examination. In one form of the invention the entire content, viz both yolks and whites of a large number of eggs, are put together in a suitable container. In other forms the yolks and whites are separated; the yolks going all together into one container, the whites into another.

Assume that the operator is operating only with whole mixed liquid eggs: He takes several of the containers prepared with that product as above, passes the contents through a screen leading to a churn, mixer or agitator machine, well known in the art. He then adds to it a quantity of edible glycerine, and operates the machine to emulsify the mixture by agitation. If outside temperature warrants it the machine is kept cool by artificial means.

After the product is thoroughly mixed it is drawn off into suitable containers and frozen solid.

If the operator is working with yolks only or whites only, the general operation is the same except that it is best not to screen the whites or agitate them too long.

In other words, there is nothing about this invention which limits it to treating the entire egg or to treating the yolks, or treating the whites, or any intermediate combination of them. The freezing operation makes the product perfectly solid in which condition it is kept until required for use by the ultimate consumer who on requiring it, allows it to thaw out and mixes it into the edible product which he is producing.

In treating a batch of egg yolks only, approximately ten parts by weight of glycerine are added to ninety parts by weight of yolks. In treating a batch of egg whites only approximately two to four per cent of glycerine by weight is used with corresponding parts by weight of egg whites and the same proportion of glycerine is used in a batch composed of mixed whole eggs.

These proportions are not at all confining as they may be varied without seriously affecting the product. The proportions are here stated as one successful formula.

Among the advantages obtained by the use of glycerine are:

The glycerine a normally liquid, edible material materially aids in preserving the physical structure and consistency of the albuminous material and other constituents in the egg substance and it does this without adding diluting liquid such as water as is necessarily the case where sugar is used unless the eggs and sugar are agitated an unduly long time to the detriment of the physical consistency of the egg. It is necessary to preserve the physical consistency of the egg in order that it may function properly when the egg is later used in the culinary art. It also serves as a sweetening agent, thus saving actual sugar without itself being a chemically saccharine substance. It facilitates the incorporation of the egg substance with the baking ingredients. It also assists in keeping the finished baked product moist; this due to its well known property of remaining moist.

Having thus described my invention what I claim as new and desire to secure by Letters Patent, is:—

1. The method of retaining the physical colloidal consistency of egg content after removal from the egg shell which consists in adding glycerine thereto, freezing the mixture and maintaining it frozen until desired for use, the amount of glycerine being sufficient to retain the physical consistency and colloidal condition of the egg substance when thawed.

2. As a new article of manufacture, egg content after removal from the egg shell containing added glycerine, and frozen below the temperature of decomposition.

3. As a new article of manufacture, egg content after removal from the egg shell containing added glycerine, and frozen below the temperature of decomposition, the amount of glycerine being sufficient to retain the physical consistency and colloidal condition of the egg substance when thawed.

4. The method of retaining the physical colloidal consistency of the egg content after removal from the egg shell which consists of adding a normally liquid edible material, freezing the mixture and maintaining it frozen until desired for use.

In witness whereof, I have hereunto subscribed my name in the presence of two witnesses.

ALBERT K. EPSTEIN.

Witnesses:
 DWIGHT B. CHEEVER,
 VELMA GRIFFITH.